United States Patent [19]
Flisch

[11] 3,955,687
[45] May 11, 1976

[54] APPARATUS FOR FEEDING WORKPIECES INTO WORK SPINDLES OF MULTIPLE-SPINDLE BAR MACHINES

[75] Inventor: Hermann Flisch, Maienfeld, Switzerland

[73] Assignee: Eunipp AG, Zug, Switzerland

[22] Filed: Nov. 12, 1974

[21] Appl. No.: 523,371

[30] Foreign Application Priority Data
Dec. 18, 1973 Switzerland............. 017714/73

[52] U.S. Cl............................ 214/1.5; 198/24; 82/27
[51] Int. Cl.²........................................ B23Q 5/20
[58] Field of Search.............. 198/19, 20 R, 24, 25; 214/1.1, 1.2, 1.3, 1.4, 1.5; 82/2.7

[56] References Cited
UNITED STATES PATENTS

| 2,781,574 | 2/1957 | Harney et al........................ 214/1.4 |
| 3,812,983 | 5/1974 | Wanner et al....................... 214/1.2 |
| 3,874,519 | 4/1975 | Mikami................................ 214/1.2 |

*Primary Examiner*—Richard A. Schacher
*Assistant Examiner*—Robert Saifer
*Attorney, Agent, or Firm*—Michael J. Striker

[57] ABSTRACT

Apparatus for feeding elongated bars into the work spindles of an automatic multiple-spindle bar machine has a turret which is mounted behind and is indexible with the carrier for work spindles, elongated tubular guides mounted in the turret and each registering with a work spindle, pushers reciprocably mounted in the guides and having projections extending laterally outwardly through longitudinally extending slots of the corresponding guides, and discrete drives for the pushers. Each drive is a chain drive mounted on the turret and having a chain a stretch of which extends in parallelism with the corresponding guide and is connected with the projection of the respective pusher. The rear sprocket wheels for the chains can be driven by discrete bevel gears through the medium of friction clutches, and these bevel gears are in mesh with a further bevel gear which is coaxial with the turret and is driven by a reversible motor by way of a worm drive and an endless belt or chain. The motor is automatically reversed when a projection actuates a limit switch which is mounted in the machine frame adjacent to the path of movement of the respective projection and is adjustable lengthwise of the respective guide.

12 Claims, 5 Drawing Figures

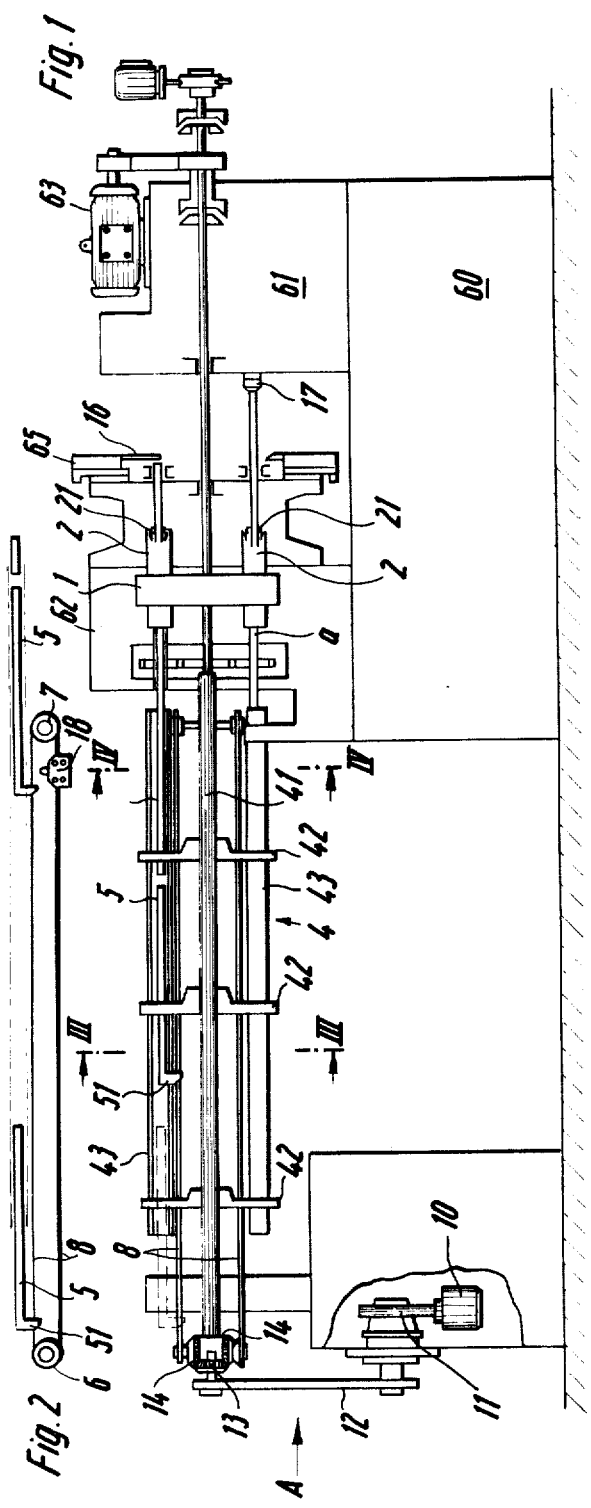
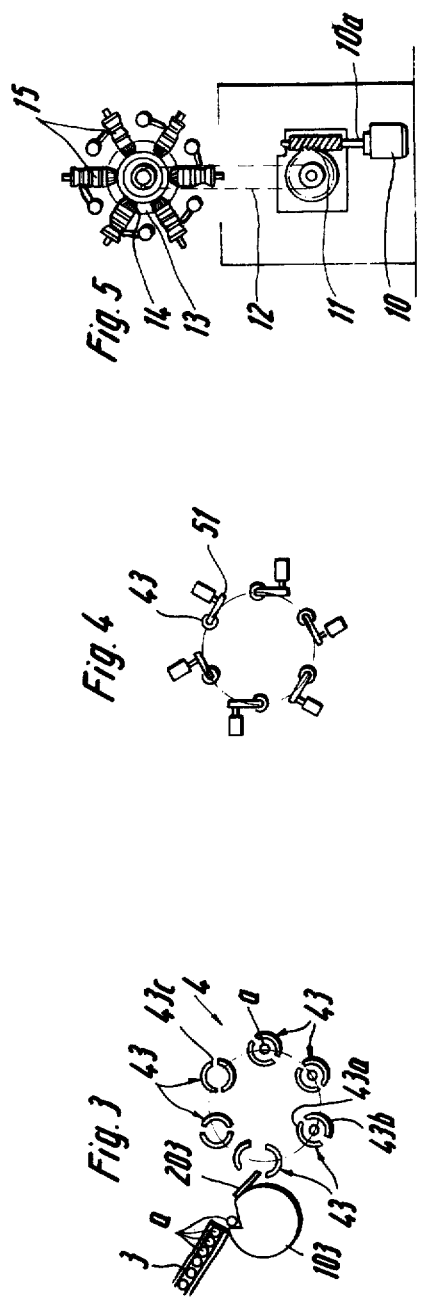

3,955,687

APPARATUS FOR FEEDING WORKPIECES INTO WORK SPINDLES OF MULTIPLE-SPINDLE BAR MACHINES

BACKGROUND OF THE INVENTION

The present invention relates to improvements in multiple-spindle automatic bar machines, and more particularly to improvements in apparatus for feeding elongated bar-shaped workpieces into the work spindles of such machines. Still more particularly, the invention relates to improvements in automatic work feeding apparatus for use in or with multiple-spindle automatic bar machines.

It is already known to utilize in or with a multiple-spindle bar machine a work feeding apparatus wherein a drum or turret is located behind and is indexible with the carrier for work spindles. The drum is connected with and indexes elongated tubular guides each of which registers with a work spindle and each of which can receive a bar-shaped workpiece so that the workpiece therein can be fed into and through the respective work spindle. The feeding apparatus further comprises a single advancing member or pusher which can engage a workpiece in one of the tubular guides to shift the engaged workpiece lengthwise toward and into the registering work spindle. A drawback of such feeding apparatus is that the length of working strokes which the pusher can perform is limited; this is the main reason that the feeding apparatus can operate properly only if the length of all workpieces is identical or nearly identical. As a rule, the differences in the length of workpieces cannot exceed 20 millimeters.

SUMMARY OF THE INVENTION

An object of the invention is to provide a novel and improved work feeding apparatus for use in or with automatic multiple-spindle bar machines which can properly feed relatively short as well as relatively long workpieces even if the difference between the length of a shorter and the length of a longer workpiece greatly exceeds 20 millimeters.

Another object of the invention is to provide a work feeding apparatus which can effect repeated lengthwise movements of a workpiece during the making of a single finished article.

A further object of the invention is to provide a work feeding apparatus which, when used in or with a machine having axially movable work spindles, can cooperate with such spindles to make finished articles whose length greatly exceeds (and can be a multiple of) the maximum length of axial movement of a work spindle.

An additional object of the invention is to provide a work feeding apparatus which can be used with equal advantage in or with bar machines having axially fixed or axially movable work spindles, whose operation can be automated to such an extent that it requires little supervision or no supervision at all, and which can be used in or with multiple-spindle bar machines having any one of a standard number of work spindles.

The invention is embodied in an apparatus for feeding elongated workpieces (e.g., round or polygonal metallic bars) into hollow work spindles of a multiple-spindle bar machine, preferably an automatic multiple-spindle bar machine wherein the work spindles are rotatably mounted in parallelism with each other in an indexible spindle carrier and may but need not be movable axially of the carrier. The apparatus comprises a support (e.g., a turret or drum) which is coaxial with and is indexible with the carrier (the support is located behind the carrier, as considered in the direction in which the workpieces are fed into the range of material removing tools in the slides of the bar machine), a plurality of elongated tubular guides mounted in the support so that each guide registers with the rear end of a work spindle, pushers reciprocably mounted in the guides, means for introducing elongated workpieces into the guides intermediate the respective pushers and work spindles (such introducing means may include one or more magazines and devices for transferring workpieces from the magazine or magazines into successive guides in retracted positions of the respective pushers), and discrete drive means for each pusher. All of the drive means are mounted on and are indexible with the support for the guides and each drive comprises a motion transmitting member (e.g., a chain or another endless flexible element) which is connected with the respective pusher and is movable in two directions to thereby move the respective pusher forwardly or rearwardly in the corresponding guide.

The apparatus preferably further comprises a common prime mover for all of the drives (e.g., a reversible electric motor which can be mounted in the frame of the bar machine) and a discrete friction clutch interposed between the prime mover and each of the drives. For example, the prime mover may rotate a first bevel gear which is coaxial with the support and can receive torque from the output member of the motor through the medium of at least one additional drive (such as a worm drive and/or a drive including at least one endless belt or an analogous endless flexible element), and the first bevel gear then meshes with several second bevel gears, one for each drive. Each drive comprises two or more rotary members (such as sprocket wheels or pulleys, depending upon whether the flexible elements of the drives are chains or belts) which are mounted in the support and one of which is driven by the respective second bevel gear by way of a torque transmitting device including a friction clutch.

Each guide is preferably formed with a longitudinally extending slot and each pusher is preferably provided with a projection extending laterally through the respective slot and being coupled to an elongated stretch of the respective flexible element, preferably a stretch which extends in parallelism with the corresponding guide.

The novel features which are considered as characteristic of the invention are set forth in particular in the appended claims. The improved feeding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of a multiple-spindle bar machine and of a work feeding apparatus which embodies the invention;

FIG. 2 is a schematic side elevational view of a drive in the feeding apparatus of FIG. 1;

FIG. 3 is a sectional view as seen in the direction of arrows from the line III—III of FIG. 1;

FIG. 4 is a sectional view as seen in the direction of arrows from the line IV—IV of FIG. 1; and FIG. 5 is an end elevational view as seen in the direction of arrow A in FIG. 1.

DESCRIPTION OF THE PREFERRED EMBODIMENTS

The multiple-spindle bar machine of FIG. 1 comprises a frame 60 having two upstanding frame members or columns 61 and 62. The frame member 61 supports a main prime mover 63 which can rotate the work spindles 2 in the indexible spindle carrier 1. The latter is rotatable in the frame member 62. Each of the work spindles 2 is movable axially, within limits, with respect to the spindle carrier 1, for example, in a manner as disclosed in detail in the commonly owned German Pat. No. 1,961,130. The work spindles 2 are hollow and their front end portions contain work gripping devices 21 of any known design. A magazine 3 (here shown as including a downwardly inclined duct) is mounted behind the frame member 62 (see FIG. 3) and serves to supply elongated workpieces $a$ into successive or selected longitudinally slotted tubular guides 43 mounted in an indexible support 4 here shown as a turret. The latter is coaxial with the work spindle 1 and is indexible therewith through identical increments. Each guide 43 registers with and is located behind one of the work spindles 2. The turret 4 is mounted on a centrally located shaft 41 and comprises several spaced-apart coaxial disks 42. The guides 43 are mounted in the disks 42 and each thereof has two halves or shells 43a, 43b one of which is pivotable between open and closed positions (see the shell 43a of the guide 43 in the nine o'clock position of FIG. 3) so that the respective guide can receive a fresh workpiece $a$ from the discharge end of the magazine 3 through the medium of a notched transfer wheel 103 and a downwardly inclined chute 203.

Each tubular guide 43 contains a longitudinally movable work advancing member or pusher 5. The rear end portion of each pusher 5 has a laterally extending projection or tooth 51 (see FIGS. 2 and 4) which extends radially outwardly from the respective guide 43 (by passing through a slot 42c between the respective shells 43a, 43b). The pushers 5 are coaxial with and are received in the rear portions of the respective guides 43. Each projection 51 is attached to the adjacent elongated stretch of an endless flexible motion transmitting element 8 here shown as a chain trained over rotary members in the form of sprocket wheels 6, 7 which are rotatably mounted in the turret 4. At least the inner stretches of the chains 8 are parallel to the axes of the respective guides 43. Each chain 8 constitutes with the associated sprocket wheels 6, 7 a discrete drive for the corresponding pusher 5.

The sprocket wheels 6 (which are remote from the spindle carrier 1) are driven by a common prime mover 10 (e.g., a reversible electric motor mounted in the frame 60) whose output member 10a is rotated at a constant speed whenever the bar machine is in use. The output member 10a of the motor 10 drives the sprocket wheels 6 through the medium of a worm drive 11, an endless belt or chain 12, a centrally located bevel gear 13, and discrete bevel gears 14, one for each sprocket wheel 6 and each meshing with the bevel gear 13. The bevel gear 13 is coaxial with the aforementioned central shaft 41. As shown in FIG. 5, the torque transmitting connection between each bevel gear 14 and the respective sprocket wheel 6 comprises a friction clutch 15.

The machine which is shown in the drawing comprises six equally spaced work spindles 2 and an equal number of tubular guides 43. When the carrier 1 is indexed (for example, in a manner as disclosed in the aforementioned German patent) so that a fresh guide 43 moves to the nine o'clock position of FIG. 3, the respective shell 43a is pivoted to open position and the wheel 103 introduces a fresh workpiece $a$ into the adjacent shell 43b before the shell 43a reassumes its closed position. When the corresponding friction clutch 15 is allowed to rotate the associated sprocket wheel 6, the pusher 5 advances the freshly introduced workpiece $a$ into the registering work spindle 2. The forward movement of the workpiece $a$ can be terminated when its front end face moves into abutment with a tool 16 which is mounted in a holder of a cross slide 65 shown in the upper part of FIG. 1 between the frame members 61 and 62. It is clear that the workpiece $a$ can be arrested by other means, for example, by a suitable stop on the frame member 61. The corresponding gripping device 21 is thereupon actuated to grasp the workpiece $a$ in the region of the front end portion of the work spindle 2. Such workpiece is then ready for treatment by one or more tools and at one or more successive working stations (i.e., in response to one or more indexing movements of the carrier 1), for example, in a manner as shown in FIGS. 3–5 of the aforementioned German patent. The workpiece $a$ can be treated while the respective work spindle 2 is held against axial movement or while the work spindle moves axially, either gradually through a single distance or in several stages or steps.

The pushers 5 are retracted (see the pusher 5 in the left-hand portion of FIG. 2) before the corresponding guides 43 receive fresh workpieces $a$. The magazine 3 is adjacent to the turret 4 and is disposed between the rear end portions of the work spindles 2 and the retracted pushers 5.

An important advantage of the improved machine is that it can produce finished workpieces whose length greatly exceeds the maximum extent of lengthwise movement of work spindles 2 relative to the spindle carrier 1. For example, a relatively long finished article can be obtained as follows: It is assumed that each work spindle 2 is movable lengthwise through a distance of at least 80 millimeters and that the bar machine is to produce finished articles whose length is 280 millimeters. Each of the articles is to be treated at both ends, and the length of treated portion at each end is 40 millimeters. In the first step, a work spindle 2 is moved axially forwardly toward the frame member 61 through a distance of 40 millimeters (starting from the fully retracted position). At the same time, the front end portion of the workpiece is treated by one or more tools so that the treatment of the front end portion (having a length of 40 millimeters) is completed when the work spindle 2 completes its forward movement. In the next step, the gripping device 21 of the thus shifted work spindle 2 is opened so that the workpiece $a$ can be advanced toward the frame member 61. Such forward movement of the workpiece is effected by the respective pusher 5 which advances the workpiece through a distance of 200 millimeters and into abutment with a stop 17 on the frame member 61. The gripping device 21 is thereupon closed to clamp the workpiece $a$ and the work spindle 2 is advanced through a distance of 40 millimeters while the workpiece is treated again so that it comprises a treated front end portion (40 millimeters long) an untreated portion (200 millimeters long) behind the treated front portion, and a second treated portion (40 millimeters long) behind the untreated portion. In the final step, the workpiece is severed behind the second treated portion so that its separated front part constitutes a finished article having an overall length of 280 millimeters. Of course, the stop 17 is removed or shifted aside while the work spindle 2 performs the second stage of its movement toward the frame member 61.

When a workpiece *a* is consumed to such an extent that its remaining portion is too short for the making of a complete finished article, the corresponding projection 51 actuates a limit switch 18 (see FIG. 2). This switch is preferably adjustable in the frame 60 lengthwise of the respective guide 43 and serves to reverse the direction of rotation of the output member 10*a* of the motor 10 so that the pushers 5 are retracted to assume their rear end positions at a maximum distance from the spindle carrier 1. This provides room for insertion of fresh workpieces *a* into the guides 43; such insertion preferably takes place in a fully automatic way by resorting to a suitable programming system which indexes the turret 4, opens the shells 43*a* of successive guides 43, causes the wheel 103 to introduce a workpiece *a*, closes the opened shell 43*a*, and so on so that each guide 43 receives a fresh workpiece. The direction of rotation of the output member 10*a* of the motor 10 is thereupon changed so that the projections 51 tend to move the workpieces *a* in the respective guides 43 forwardly and are free to effect such movement of workpieces when the respective gripping devices 21 are open and/or when the work spindles 2 are caused to move forwardly toward the frame member 61.

It is clear that the bar machine may be equipped with at least two magazines 3 so that the loading of guides 43 with fresh workpieces takes up less time. It is further clear that the illustrated bar machine can be operated as a twin three-spindle or as a triple two-spindle automatic, for example, when the treatment of a workpiece can be completed at three or two working stations (i.e., in response to two indexing movements or in response to a single indexing movement of the carrier 1). In fact, it is also possible to treat workpieces which can be converted into a succession of finished articles without any indexing of the carrier 1.

Still further, the improved work feeding apparatus can be incorporated in or combined with multiple-spindle bar machines wherein the work spindles cannot or need not move axially with respect to the spindle carrier. In such machines, the gripping devices 21 may be omitted altogether or deactivated, at least in connection with the manufacture of certain types of articles.

An important advantage of the improved work feeding apparatus is that it can properly feed relatively long or relatively short workpieces (round or polygonal bars or the like). Thus, a batch of relatively short workpieces can be followed by a batch of much longer workpieces whereby the difference between the length of a short and a long workpiece may greatly exceed 20 millimeters. Another important advantage of the work feeding apparatus is that, especially when used in or with a multiple-spindle bar machine having axially movable work spindles, the treatment of a workpiece for the purpose of making a single finished article can involve several axial movements of the workpiece, either with respect to or with the corresponding work spindle and in two or more different angular positions of the spindle carrier. A further important advantage of the work feeding apparatus is that, when used in or with a machine having axially movable work spindles, the length of finished articles can greatly exceed the maximum length of movement of a work spindle with respect to its carrier.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. Apparatus for feeding elongated workpieces into hollow work spindles of a multi-spindle bar machine wherein the work spindles are parallel to each other and are mounted in an indexible spindle carrier, comprising a support coaxial and indexible with the carrier; a plurality of elongated tubular guides mounted in said support and each thereof being in register with a work spindle; a pusher reciprocably mounted in each of said guides; means for introducing elongated workpieces into said guides intermediate the respective pushers and work spindles; discrete drive means for each of said pushers, all of said drive means being mounted on and being indexible with said support and each thereof comprising a motion transmitting element connected with the respective pusher and being movable in two directions to thereby move the respective pusher forwardly and rearwardly in the respective guide; a common prime mover for all of said drive means; and a discrete friction clutch interposed between said prime mover and each of said drive means so that said prime mover can operate a first drive means while a second drive means is held at standstill.

2. Apparatus as defined in claim 1, wherein each of said motion transmitting elements is an endless flexible element having an elongated stretch parallel to the respective guide and connected to the respective pusher.

3. Apparatus as defined in claim 2, wherein said endless flexible elements are chains and each of said drives further comprises sprocket wheels rotatably mounted in said support, said chains being trained over the respective sprocket wheels.

4. Apparatus as defined in claim 2, wherein each of said pushers has an end portion remote from the corresponding work spindle and a projection extending laterally from said end portion and from the respective guide and being connected to said stretch of the respective endless flexible element.

5. Apparatus as defined in claim 4, wherein each of said guides has a longitudinally extending slot and said projections of said pushers extend outwardly through said slots of the respective guides.

6. Apparatus as defined in claim 2, wherein said prime mover includes a reversible motor and further comprising reversing means for said motor, said reversing means comprising projections provided on said pushers and extending laterally from the respective guides and being connected with said stretches of the respective endless flexible elements, and limit switches located in the path of movement of said projections.

7. Apparatus as defined in claim 6, wherein said limit switches are adjustable in said machine lengthwise of the respective guides.

8. Apparatus for feeding elongated workpieces into hollow work spindles of a multi-spindle bar machine wherein the work spindles are parallel to each other and are mounted in an indexible spindle carrier, comprising a support coaxial and indexible with the carrier; a plurality of tubular guides mounted in said support and each thereof being in register with a work spindle; a pusher reciprocably mounted in each of said guides; means for introducing elongated workpieces into said guides intermediate the respective pushers and work spindles; discrete drive means for each of said pushers, all of said drive means being mounted on and being indexible with said support and each thereof comprising a plurality of rotary members mounted on said support and an endless flexible element trained over the respective rotary members and having an elongated stretch parallel to the respective guides and connected to the respective pusher; means for moving said flexible elements including a prime mover, a first bevel gear driven by said prime mover, a plurality of second bevel gears, one for each of said drive means and meshing with said first bevel gears; and means for transmitting torque from each of said second bevel gears to one rotary member of the respective drive means, each of said torque transmitting means comprising a friction clutch.

9. Apparatus as defined in claim 8, wherein said support is indexible about a predetermined axis and the axis of said first bevel gear coincides with said predetermined axis.

10. Apparatus as defined in claim 8, wherein said prime mover is a motor having a rotary output member and further comprising at least one additional drive interposed between said output member and said first bevel gear.

11. Apparatus as defined in claim 10, wherein said additional drive is a worm drive.

12. Apparatus as defined in claim 10, wherein said additional drive includes an endless flexible element.

* * * * *